United States Patent [19]
Takano et al.

[11] Patent Number: 5,924,296
[45] Date of Patent: Jul. 20, 1999

[54] MOTOR VEHICLE AIR-CONDITIONING APPARATUS WITH ENGINE SPEED CONTROL

[75] Inventors: Yoshiaki Takano, Kosai; Hiroshi Kishita, Anjo; Kurato Yamasaki, Kariya, all of Japan

[73] Assignee: Denso Corporation, Kariya, Japan

[21] Appl. No.: 09/158,805

[22] Filed: Sep. 22, 1998

Related U.S. Application Data

[30]     Foreign Application Priority Data

Oct. 7, 1997  [JP]  Japan ................................. 9-273992
Jul. 2, 1998  [JP]  Japan ................................ 10-187119

[51] Int. Cl.$^6$ ................................................. B60H 1/32
[52] U.S. Cl. ..................... 62/133; 62/228.3; 62/228.5; 62/229; 123/339.17
[58] Field of Search ................................. 62/133, 323.1, 62/228.1, 228.3, 228.4, 228.5, 229, 208, 209, 243; 123/339.17

[56]             References Cited

U.S. PATENT DOCUMENTS

| | | | |
|---|---|---|---|
| 4,856,291 | 8/1989 | Takahashi | 62/217 |
| 4,898,005 | 2/1990 | Sakurai | 62/228.5 X |
| 4,976,589 | 12/1990 | Ide | 417/34 |
| 5,285,649 | 2/1994 | Yamanaka et al. | 62/133 |
| 5,385,029 | 1/1995 | Yamanaka et al. | 62/133 |
| 5,752,387 | 5/1998 | Inagaki et al. | 62/133 |

FOREIGN PATENT DOCUMENTS

A-1-244916  9/1989  Japan .
A-2-028016  1/1990  Japan .

*Primary Examiner*—Harry B. Tanner
*Attorney, Agent, or Firm*—Harness, Dickey & Pierce, PLC

[57]             ABSTRACT

An automobile air-conditioning apparatus in which the compressor torque of a variable capacity refrigerant compressor is estimated with improved accuracy. The compressor torque is measured on the basis of (1) high-side pressure of the refrigerating circuit directly influencing the compressor torque and (2) a control current value directly controlling the compressor. The accurately estimated compressor torque is then used to stabilize the speed of the vehicle engine driving the compressor.

17 Claims, 12 Drawing Sheets

MOTOR VEHICLE AIR-CONDITIONING APPARATUS WITH ENGINE SPEED CONTROL

CROSS-REFERENCE TO RELATED APPLICATIONS

This application is based on, and claims priority from, Japanese unpublished patent applications Hei. 9-273992 and Hei. 10-187119, the contents of which are incorporated herein by reference.

BACKGROUND OF THE INVENTION

1. Technical Field

This invention relates generally to a motor vehicle air-conditioning apparatus having an externally variable capacity type refrigerant compressor driven by the vehicle engine, and particularly to an air-conditioning apparatus which controls the idling speed of the engine based on (1) compressor torque calculated from a high-side pressure of an apparatus refrigerating circuit and (2) the value of a control current of a compressor electromagnetic capacity control valve.

2. Discussion

In Japanese Unexamined Patent Publication No. H.1-271645, a refrigerating circuit has an internally variable capacity type refrigerant compressor in which the torque needed to drive the compressor during idling is calculated on the basis of the high-side pressure of the refrigerating circuit. Engine control is carried out to stabilize the idling speed of the engine on the basis of this compressor torque. In Japanese Unexamined Patent Publication No. H.1-175517 a refrigerating circuit has an externally variable capacity type refrigerant compressor, and the torque needed to drive the compressor during idling is calculated on the basis of the cooling heat load and the intake pressure of the refrigerant compressor. Engine control is carried out to stabilize the idling speed of the engine on the basis of this compressor torque.

However, when the first related art mentioned above is applied to a refrigerating circuit having an externally variable capacity type refrigerant compressor, at times such as in spring and autumn when the cooling heat load is an intermediate heat load, the variation between the estimated compressor torque and the actual compressor torque is large. Consequently, the idling speed of the engine is not stable, and engine stalling may occur.

In the second related art mentioned above, the compressor torque is estimated on the basis of the cooling heat load and the intake pressure of the refrigerant compressor. However, this kind of calculating method is too indirect with respect to the actual compressor torque and has poor accuracy. Therefore, the idling speed of the engine is not stable, and engine stalling may occur.

SUMMARY OF THE INVENTION

It is therefore an object of the present invention to provide an air-conditioning apparatus for a vehicle which can estimate the compressor torque during idling and during traveling with good accuracy. It is another object of the invention to provide an engine controlling apparatus which can use this accurately estimated compressor torque to execute control for stabilizing the speed of the engine.

According to the invention, the compressor torque needed to drive an air conditioner refrigerant compressor is calculated on the basis of detected high-side pressure of the refrigerating circuit, and detected low-side pressure of the refrigerating circuit. This calculated compressor torque provides an accurate approximation of the actual compressor torque and can therefore be used for various types of control.

FIG. 17 is a view showing relationships between high-side pressure, compressor torque and delivery pressure. The estimated compressor torque (T) of a refrigerant compressor is determined by the delivery pressure (high-side pressure, Pd), the intake pressure of the refrigerant compressor (the low-side pressure, Ps) and the delivery capacity (Vc) of the refrigerant compressor, as expressed by the following Equation 1.

$$T \alpha (k/k-1) \cdot Ps \{(Pd/Ps)^{(k-1)/k} - 1\} Vc \qquad \text{Equation 1}$$

Here, when the low-side pressure (Ps) is controlled to a fixed value (for example Ps=2 kgf/cm$^2$G), the compressor torque is determined by the high-side pressure (Pd) and the delivery capacity (Vc). However, in practice (for example when in economy control the post-evaporator temperature is being controlled to a target post-evaporator temperature TEO) when the delivery capacity (Vc) is small, no high high-side pressure (Pd) appears (A), and when the delivery capacity (Vc) is large, no low high-side pressure (Pd) appears (B), and an estimated compressor torque can be obtained from high-side pressure (Pd).

Therefore, for different values of the low-side pressure (Ps), the estimated compressor torque (T) can be approximated from the high-side pressure (Pd) and the low-side pressure (Ps). Here, in the case of a refrigerant compressor, because the low-side pressure (Ps) is controlled by means of a control current value, this control current value can be used in place of the low-side pressure (Ps).

DETAILED DESCRIPTION OF THE PREFERRED EMBODIMENTS

Figure 1:
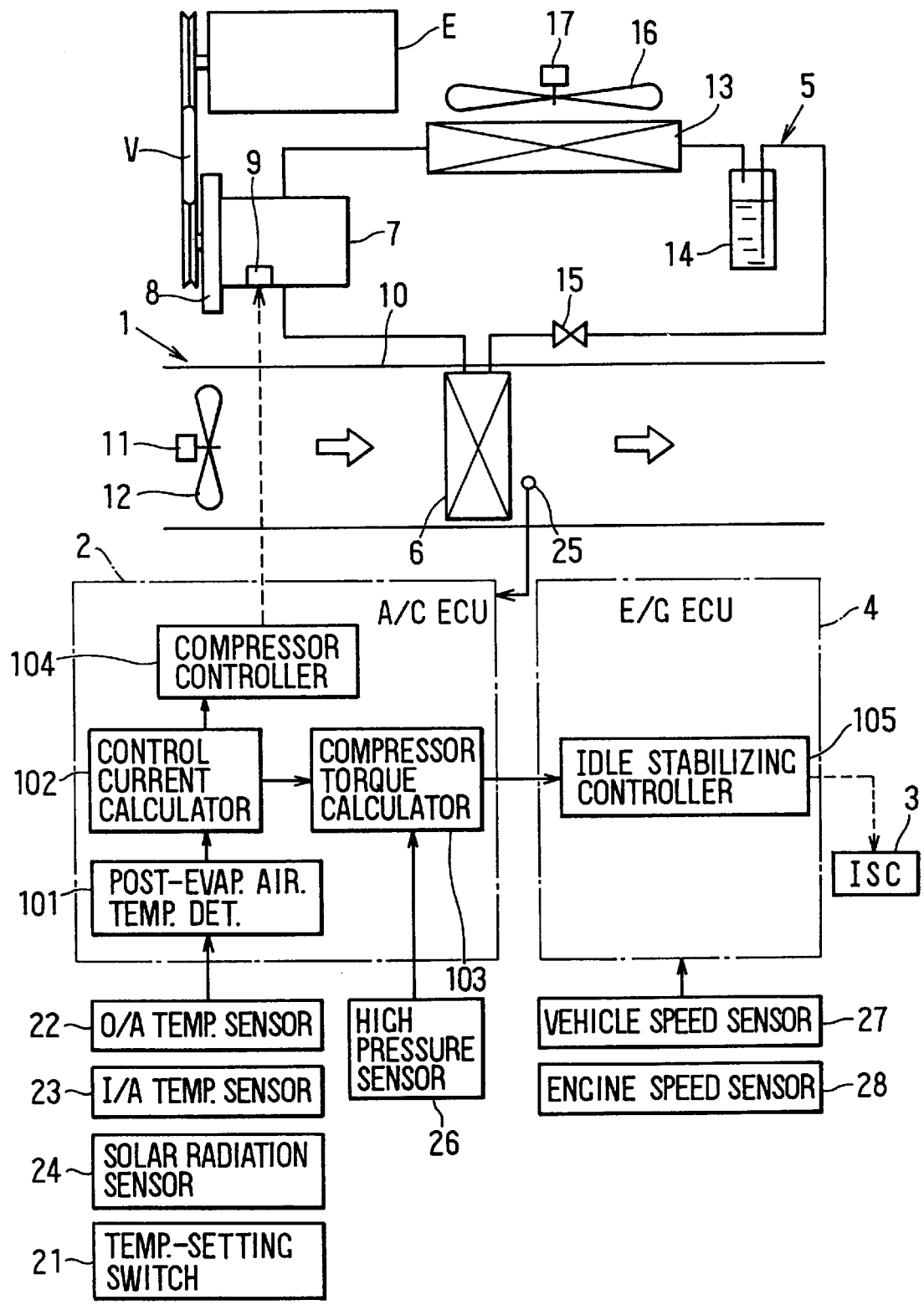
FIG. 1 is a schematic view showing the overall construction of an air-conditioning apparatus for a vehicle according to a first preferred embodiment of the present invention.

FIG. 1 through FIG. 15 show a motor vehicle air conditioning system according to a first preferred embodiment of the present invention. FIG. 1 is a schematic view showing the overall construction of the air-conditioning system.

In the air-conditioning system of this preferred embodiment, various air-conditioning actuators in an air-conditioning unit 1 for conditioning the air inside the passenger compartment of a vehicle are controlled by an air-conditioning control unit (hereinafter called the air-conditioning ECU) 2. The actuators, which include an idle speed control valve (hereinafter, ISC valve) 3 in a vehicle engine (an internal combustion engine) E, are controlled by an engine control unit (hereinafter, engine ECU) 4.

The air-conditioning unit 1 has an air-conditioning duct 10 for guiding air from inside the passenger compartment or air from outside the passenger compartment into the passenger compartment of the vehicle. A centrifugal blower for blowing air toward the inside of the passenger compartment through this air-conditioning duct 10 is mounted at the upstream end of the air-conditioning duct 10. This centrifugal blower consists of a blower motor 11 controlled by the air-conditioning ECU 2, and a centrifugal fan 12 rotatably driven by the blower motor 11.

At the downstream end of the air-conditioning duct 10, a defroster (DEF) outlet for blowing mainly warm air onto the inner side of the front windshield, a face (FACE) outlet for blowing mainly cold air onto the head and upper body of a passenger, and a foot (FOOT) outlet for blowing mainly warm air onto the legs and feet of a passenger are formed (none of these outlets are shown in the figures).

An evaporator 6, which is a cooling heat-exchanger for cooling air passing through the air-conditioning duct 10 and which forms a constituent part of a refrigerating circuit 5 installed in the vehicle, is centrally mounted in the air-conditioning duct 10 to occupy the entire cross-section of the air passage inside the air-conditioning duct 10.

The above-mentioned refrigerating circuit 5 includes a compressor 7 for taking in, compressing and delivering a refrigerant; a condenser 13 for condensing refrigerant from the compressor 7 by exchanging heat with outside air; a reservoir 14 for vapor/liquid-separating refrigerant from the condenser 13 and temporarily storing surplus refrigerant inside the refrigerating circuit 5; and an expansion valve 15 for reducing the pressure of liquid refrigerant from this reservoir 14 and causing it to expand. The above-mentioned evaporator 6 causes low-pressure refrigerant from the expansion valve 15 to evaporate by exchanging heat with air inside the air-conditioning duct 10. Refrigerant pipes connect these parts together. The reference numeral 16 denotes a cooling fan rotatably driven by a drive motor 17, for forcibly blowing outside air through the condenser 13.

Figure 2:
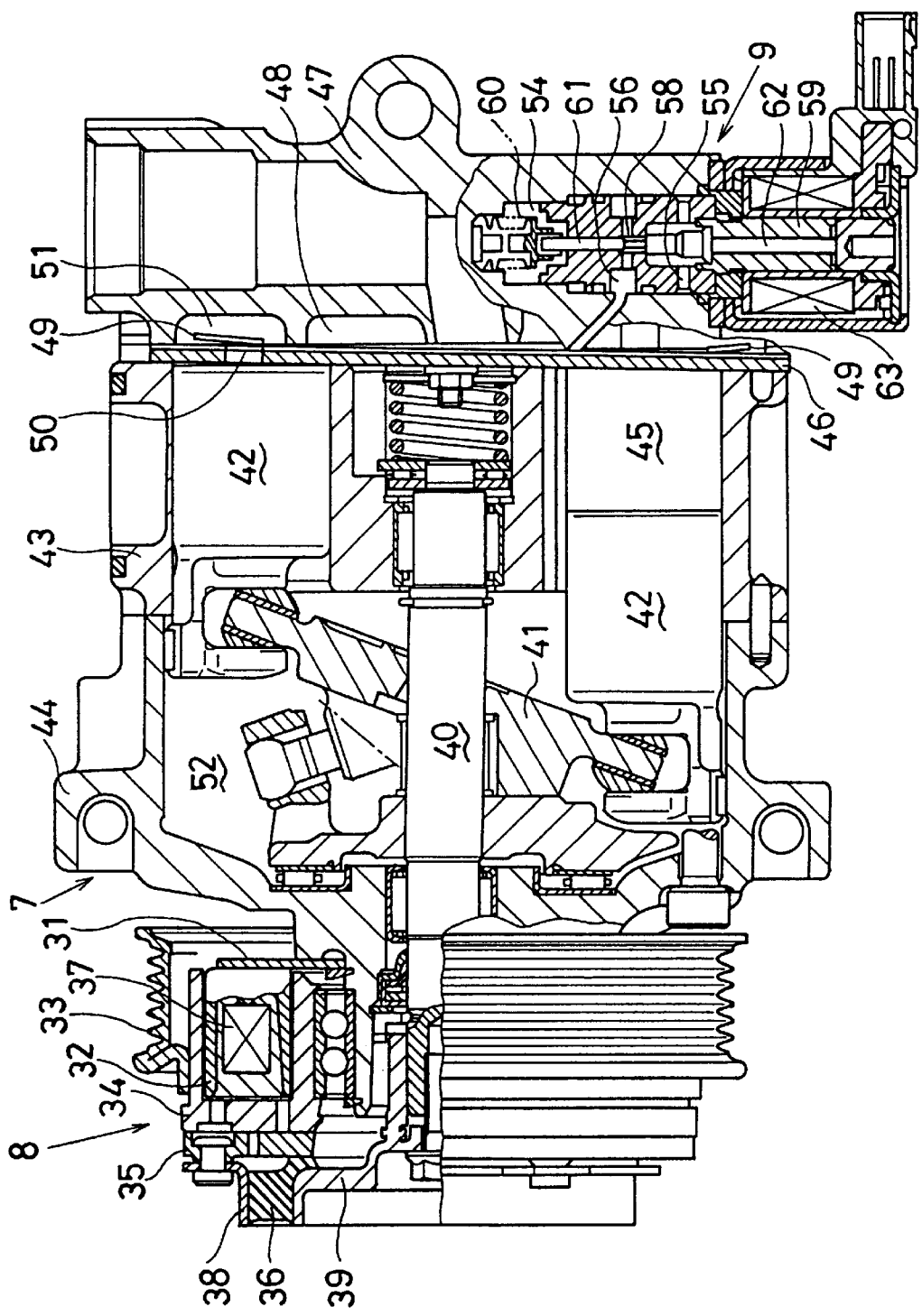
FIG. 2 is a sectional view of an electromagnetic clutch and a variable delivery capacity type compressor of the first preferred embodiment.

Next, the compressor 7 of the preferred embodiment will be described briefly on the basis of FIG. 1 through FIG. 5B. Referring first to FIG. 2 is a partial sectional side view of a variable displacement compressor 7 with an integrated electromagnetic clutch. That is, an electromagnetic clutch 8 for transmitting and cutting off power from the engine E to the compressor 7 is connected to the compressor 7. The electromagnetic clutch 8 includes a stator housing 32 fixed with an annular mounting flange 31 therebetween to a housing 44 of the compressor 7, a rotor 34 having attached to its periphery a pulley 33 connected to the engine E by a belt V, an armature 35 disposed facing this rotor 34 across a narrow gap and having a friction face for frictionally engaging with a friction face of the rotor 34, an electromagnetic coil 37 for attracting the armature 35 toward the rotor 34 against the elastic force of a rubber hub or similar elastic member 36 by producing a magnetic flux when a current is passed through it, and an inner hub 39 connecting the armature 35 with a shaft 40 of the compressor 7 by way of an outer hub 38 and the rubber hub 36.

The compressor 7 is of a well-known type, and may be, for example, a waffle type compressor whose delivery capacity can be varied. The compressor includes a shaft 40, which rotates integrally with the inner hub 39 of the electromagnetic clutch 8; a swash plate 41 fixed diagonally to this shaft 40; and pistons 42 fitted to the swash plate 41. The above-mentioned housing 44 is connected to a cylinder 43 in which the pistons 42 slide. An electromagnetic delivery control valve is connected to the rear end of the housing 44 for changing the delivery capacity of the compressor 7.

The cylinder 43, the pistons 42 and a valve plate 46 form cylinder chambers 45. An intake opening (not shown) opened and closed by a suction valve (not shown) formed with an elastic metal sheet is formed in the valve plate 46 toward the center thereof. This intake opening connects with an intake port 48 formed in a valve body 47 of the electromagnetic delivery control valve 9. A delivery opening 50 opened and closed by a discharge valve 49 formed with an elastic metal sheet is formed toward the periphery of the valve plate 46. This delivery opening 50 connects with a delivery port 51 formed in the valve body 47. A fixed throttle 53 is provided inside the housing 44 (see FIGS. 3A, 4A and 5A) for effectively connecting a crank chamber 52 for allowing the swash plate 41 to be displaced toward the intake port 48.

When a current is passed through the electromagnetic coil 37 of the electromagnetic clutch 8, the armature 35 of the electromagnetic clutch 8 is attracted toward the rotor 34 and frictionally engages with the rotor 34, and power from the engine E is transmitted by way of the belt V and the electromagnetic clutch 8 to the shaft 40 of the compressor 7. As a result, the refrigerating circuit 5 starts to operate, and an air-cooling action of the evaporator 6 is obtained.

When the current passed through the electromagnetic coil 37 of the electromagnetic clutch 8 is stopped (i.e. when the electromagnetic coil 37 is off), the armature 35 of the electromagnetic clutch 8 moves away from the rotor 34, and the frictional engagement of the rotor 34 and the armature 35 is ended. As a result, power from the engine E is not transmitted to the shaft 40 of the compressor 7, and the air-cooling action of the evaporator 6 is stopped.

Figure 3A:
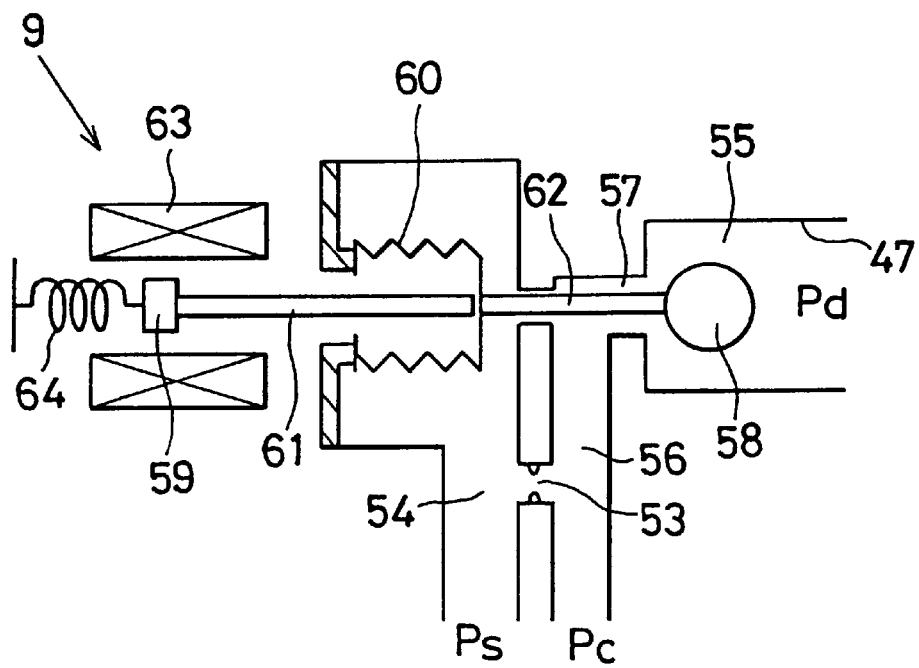
FIG. 3A is a schematic view illustrating an electromagnetic capacity control valve built into the compressor.
Figure 3B:
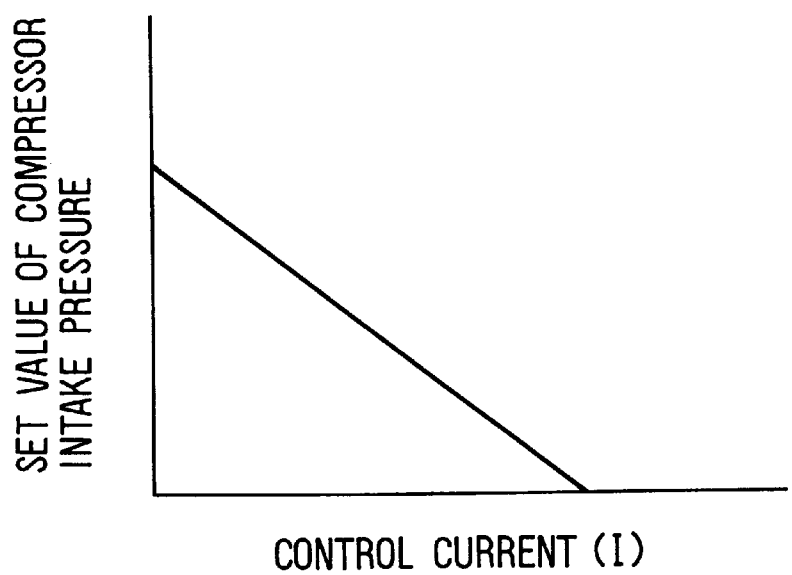
FIG. 3B is a graph showing the relationship between a control current value and a set value of intake pressure of the compressor.

Next, the electromagnetic delivery control valve 9 will be described, with reference being made to FIG. 1 through FIG. 5B. Referring first to FIGS. 3A and 3B, FIG. 3A is a schematic view of the electromagnetic delivery control valve 9, which is built into the compressor 7, is shown, while FIG. 3B is a graph showing the relationship between a control current value and a set value of intake pressure of the compressor 7.

The electromagnetic delivery control valve 9 has a valve body 47, in which are formed a pressure passage 54 to which is applied the compressor intake pressure (Ps), a pressure passage 55 to which is applied the compressor delivery pressure (Pd), a pressure passage 56 which applies a crank chamber pressure (Pc) to the crank chamber 52, and a connecting aperture 57 which connects the pressure passages 55, 56.

The degree of opening of the connecting aperture 57 is determined by the position of a valve member 58. The position of the valve member 58 is determined by the position of a plunger 59 and bellows 60. The plunger 59 and the bellows 60 are connected to the valve member 58 by rods 61, 62. A set position of the plunger 59 is changed according to the size of a control current supplied to an electromagnetic coil 63. The reference numeral 64 denotes a return spring for returning the plunger 59 to an initial position.

Thus, the electromagnetic delivery control valve 9 varies the delivery capacity of the compressor 7 by changing a set value of the intake pressure (Ps) of the compressor 7 on the basis of a control current from the air-conditioning ECU 2, as shown in FIG. 3B. That is, as shown in FIG. 3A, the delivery control valve 9 is constructed to vary an external force on the plunger 59 and the bellows 60 by a control current applied to the electromagnetic coil 63 inside the valve body 47. The delivery control valve 9 performs control to obtain a target post-evaporator cooling air temperature (TEO) by changing the degree of opening of the valve member 58 to adjust the intake pressure (Ps).

Figure 4A:
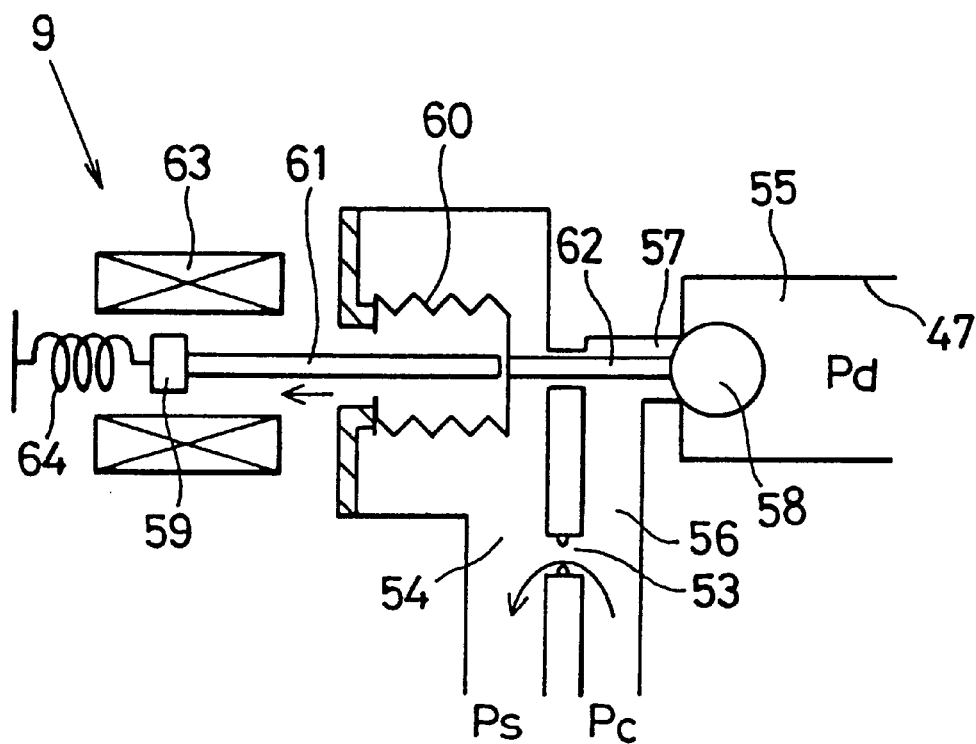
FIG. 4A is a schematic view illustrating the state of the electromagnetic capacity control valve when the delivery capacity is large.
Figure 4B:
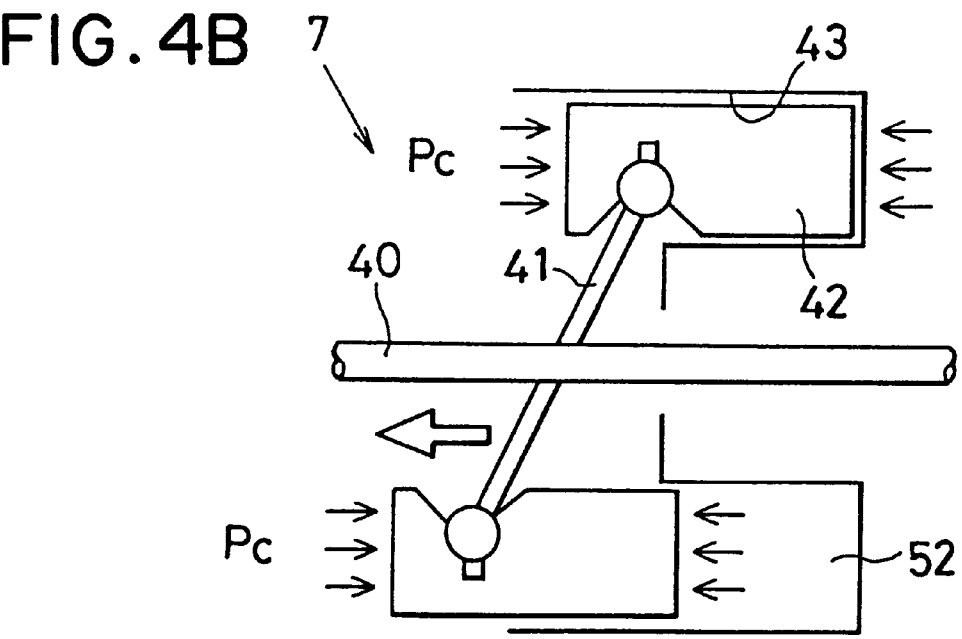
FIG. 4B is a view illustrating the state of the compressor when the delivery capacity is large.
Figure 5A:
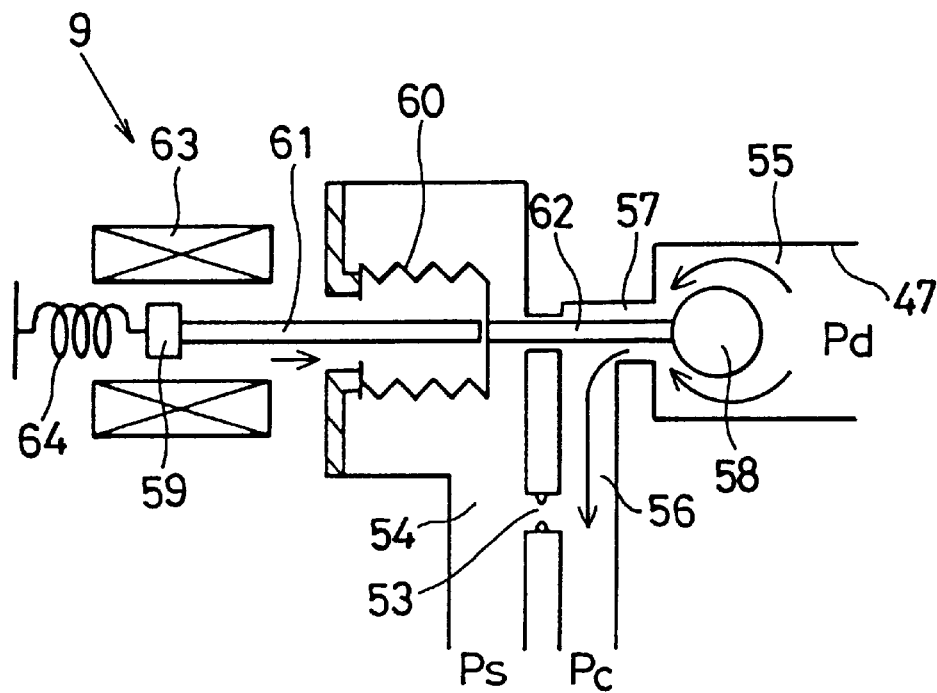
FIG. 5A is a schematic view illustrating the state of the electromagnetic capacity control valve when the delivery capacity is small.
Figure 5B:
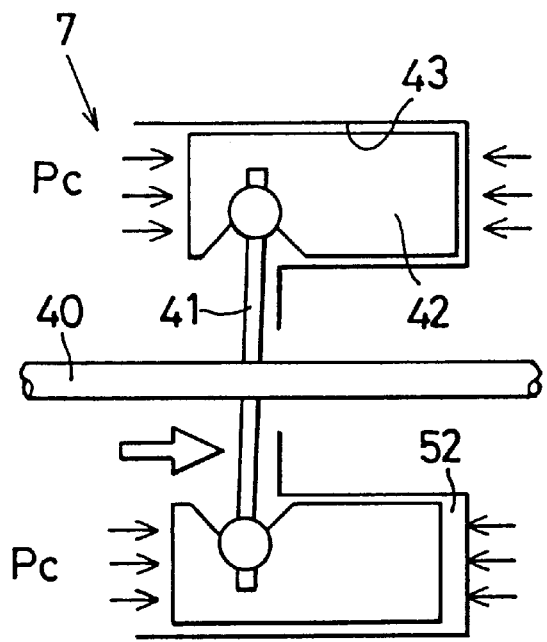
FIG. 5B is a view illustrating the state of the compressor when the delivery capacity is large.

The method by which the delivery capacity of the compressor 7 is varied by the delivery control valve 9 will now be described using FIGS. 4A through 5B. FIG. 4A is a schematic view showing the state of the delivery control valve 9 when the delivery capacity of the compressor 7 is large, and FIG. 4B is a schematic view showing the state of the compressor 7 when the delivery capacity is large. FIG. 5A is a schematic view showing the state of the delivery control valve 9 when the delivery capacity of the compressor 7 is small, and FIG. 5B is a schematic view showing the state of the compressor 7 when the delivery capacity is small.

First, when the actual post-evaporator cooling air temperature (TE) is considerably higher than the above-mentioned target post-evaporator cooling air temperature (TEO), the control current (I) flowing through the electromagnetic coil 63 of the delivery control valve 9 is increased, and the set value of the intake pressure (Ps) of the compressor 7 is thereby reduced. In this case, as shown in FIG. 4A, the plunger 59 of the delivery control valve 9 retracts, the valve member 58 of the delivery control valve 9 approaches the connecting aperture 57, and the degree of opening of the connecting aperture 57 decreases. Consequently, the delivery pressure (Pd) of the compressor 7 enters the pressure passage 56 less readily, and the crank chamber pressure (Pc) decreases. Then, due to the crank chamber pressure (Pc) decreasing, as shown in FIG. 4B, the inclination of the swash plate 41 of the compressor 7 increases, and the stroke of the pistons 42 becomes longer. As a result, the delivery pressure (Pd) of the compressor 7 rises. Consequently, the delivery capacity of the compressor 7 increases.

When the actual post-evaporator cooling air temperature (TE) is substantially equal to the target post-evaporator cooling air temperature (TEO), the control current (I) flowing through the electromagnetic coil 63 of the delivery control valve 9 is decreased, and the set value of the intake pressure (Ps) of the compressor 7 is thereby raised. In this case, as shown in FIG. 5A, the plunger 59 extends, the valve member 58 moves away from the connecting aperture 57, and the degree of opening of the connecting aperture 57 increases. Consequently, the delivery pressure (Pd) of the compressor 7 enters the pressure passage 56, and the crank chamber pressure (Pc) rises. Then, due to the crank chamber pressure (Pc) increasing, as shown in FIG. 5B, the inclination of the swash plate 41 of the compressor 7 decreases, and the stroke of the pistons 42 becomes shorter. As a result, the delivery pressure (Pd) of the compressor 7 falls. Consequently, the delivery capacity of the compressor 7 decreases.

Next, the construction of the air-conditioning ECU 2 of the preferred embodiment will be described with reference being made to FIG. 1. Switch signals from switches on an air-conditioning control panel (not shown) mounted in the front of the passenger compartment are input to the air-conditioning ECU 2, which controls the air-conditioning unit 1. A temperature setting switch 21 for setting the temperature inside the passenger compartment to a desired temperature is provided on the air-conditioning control panel.

An ordinary microcomputer including a CPU, ROM, RAM and so on is provided inside the air-conditioning ECU 2, and sensor signals from various sensors are A/D converted by an input circuit (not shown) and inputted into this microcomputer. When an ignition switch for starting and stopping the engine E of the vehicle is switched on, the air-conditioning ECU 2 is operated by direct current power supplied to it from a battery mounted in the vehicle.

The microcomputer also has post-evaporator cooling air temperature determiner 101 for determining first and second target post-evaporator cooling air temperatures, for example, on the basis of a target cooling air temperature (TAO) and an outside air temperature (TAM), and a control current calculator 102 for calculating a control current value (I) so that the actual post-evaporator cooling air temperature (TE) approaches the target post-evaporator cooling air temperature (TEO). The microcomputer is also provided with a compressor torque calculator 103 for calculating the compressor torque needed to drive the compressor 7, and a compressor controller 104 for supplying the calculated control current (I) to the electromagnetic coil 63 of the delivery control valve 9 and thereby controlling the delivery capacity of the compressor 7.

The above-mentioned switches and sensors detect air-conditioning environment factors needed for air-conditioning the passenger compartment. An outside air temperature sensor 22 including an outside air temperature detector for detecting the air temperature outside the passenger compartment, an inside air temperature sensor 23 including inside air temperature detector for detecting the air temperature inside the passenger compartment, and a solar radiation sensor 24 including solar radiation detector for detecting solar radiation entering the passenger compartment are connected to the air-conditioning ECU 2.

Also connected to the air-conditioning ECU 2 are a post-evaporator cooling air temperature sensor 25 including a degree of cooling detector for detecting the actual degree of cooling effected by the evaporator 6 and a high pressure sensor 26 having a high pressure detector for detecting a high-side pressure of the refrigerating circuit 5. Of these, the post-evaporator cooling air temperature sensor 25 is a thermistor for detecting the temperature of air in the air-conditioning duct 10 having just passed through the evaporator 6 (hereinafter referred to as the post-evaporator cooling air temperature TE), as shown in FIG. 1. The high pressure sensor 26 is mounted in a suitable position between the delivery port of the compressor 7 and the inlet of the expansion valve 15 and detects the refrigerant pressure in the high pressure refrigerant line (the delivery pressure Pd of the compressor 7) of the refrigerating circuit 5.

Next, the construction of the engine ECU 4 of the preferred embodiment will be described on the basis of FIG. 1. The engine ECU 4 also has an ordinary microcomputer including a CPU, ROM, RAM and so on, and sensor signals from various sensors are A/D converted by an input circuit and input into this microcomputer. The engine ECU 4, like the air-conditioning ECU 2, is operated by direct current power supplied to it from the vehicle battery when the ignition switch is switched on.

The microcomputer has an idling speed stabilizing controller 105 for stabilizing the idling speed of the engine E on the basis of the compressor torque calculated by the compressor torque calculator 103 of the air-conditioning ECU 2. A vehicle speed sensor 27 including a vehicle speed detector for detecting the speed of the vehicle and a speed sensor 28 including a speed detector for detecting the speed of the engine E are connected to the engine ECU 4.

Next, the operation of the air-conditioning ECU 2 of the preferred embodiment will be described on the basis of FIG. 1 through FIG. 12. Here, FIG. 6 is a flow diagram showing compressor capacity varying control carried out by the air-conditioning ECU 2.

Figure 6:
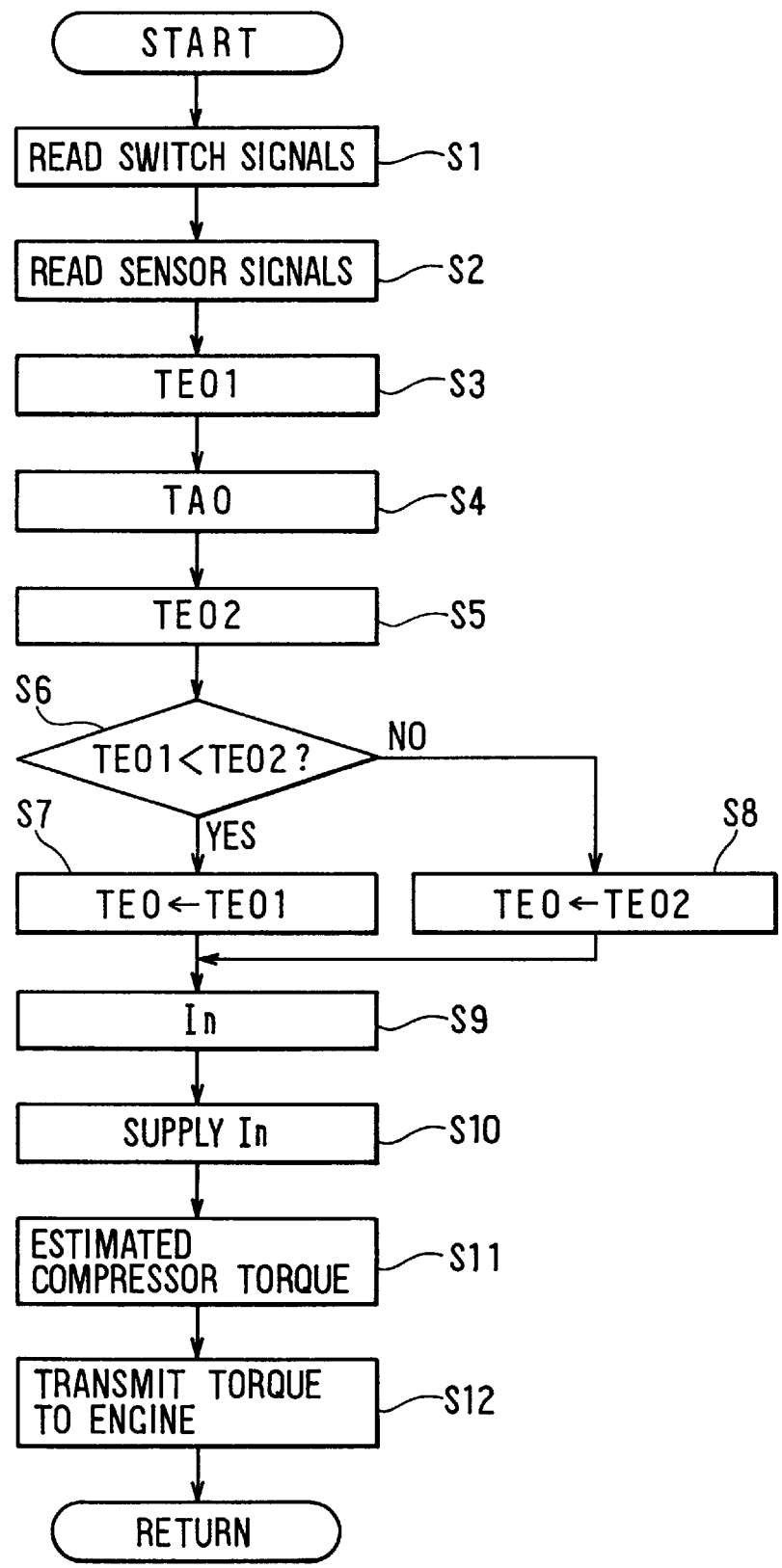
FIG. 6 is a flow diagram showing compressor capacity varying control executed by an air-conditioning ECU.

First, when the ignition switch is turned on and d.c. power is supplied to the air-conditioning ECU 2, the routine of FIG. 6 is started. Switch signals from the switches on the air-conditioning control panel are read in (step S1). Specifically, a set temperature (Tset) set with the temperature setting switch 21 and so on are read in.

Next, sensor signals from the sensors are read in (step S2). Specifically, the outside air temperature (TAM) detected by the outside air temperature sensor 22, the solar radiation (TS) detected by the solar radiation sensor 24, the inside temperature (TR) detected by the inside air temperature sensor 23, the actual post-evaporator cooling air temperature (TE) detected by the post-evaporator cooling air temperature sensor 25, and the high-side pressure (Ph) of the refrigerating circuit 5 detected by the high pressure sensor 26 are read in.

Figure 7:
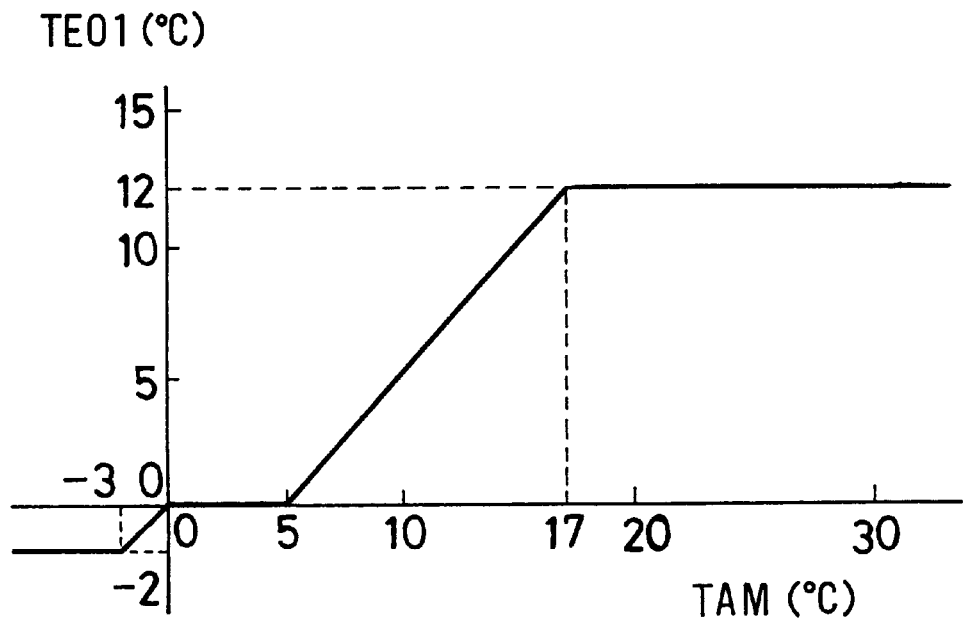
FIG. 7 is a characteristic diagram showing the correlation between an outside temperature and a first target post-evaporator cooling air temperature in the present invention.

Then, on the basis of a pattern (characteristic chart, or map) pre-stored in ROM, shown in FIG. 7, a first target post-evaporator cooling air temperature (TEO1) is calculated (determined) from the outside air temperature (TAM) detected by the outside air temperature sensor 22 (step S3). Specifically, from the pattern shown in FIG. 7, the first target post-evaporator cooling air temperature (TEO1) is so calculated (set) that it is higher than the outside air temperature (TAM).

Then, on the basis of the following Equation 2 stored in ROM, a target cooling air temperature (TAO) of air blown into the passenger compartment is calculated (step S4).

$$TAO = Kset \cdot Tset - Kr \cdot TR - KAM \cdot TAM - KS \cdot TS + C \qquad \text{Equation 2}$$

Here, Tset is the set temperature set with the temperature setting switch 21, TR is the inside temperature detected by the inside air temperature 23, TAM is the outside temperature detected by the outside air temperature sensor 22, and TS is the solar radiation detected by the solar radiation sensor 24. Kset, KR, KAM and KS are gains and C is a constant for correction.

Figure 8:
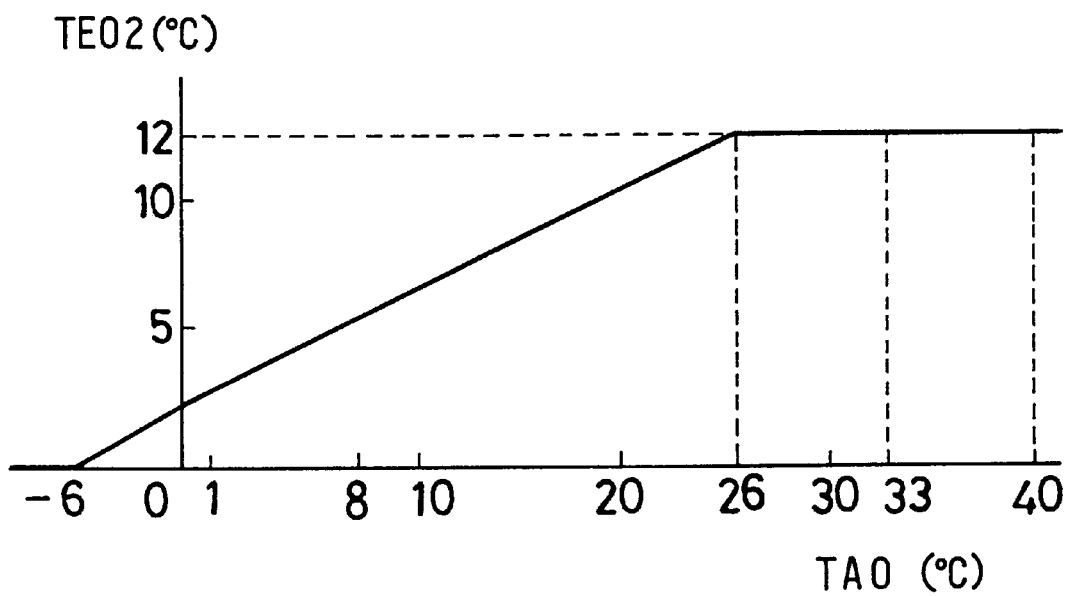
FIG. 8 is a characteristic diagram showing the correlation between a target cooling air temperature and a second target post-evaporator cooling air temperature.
Figure 9:
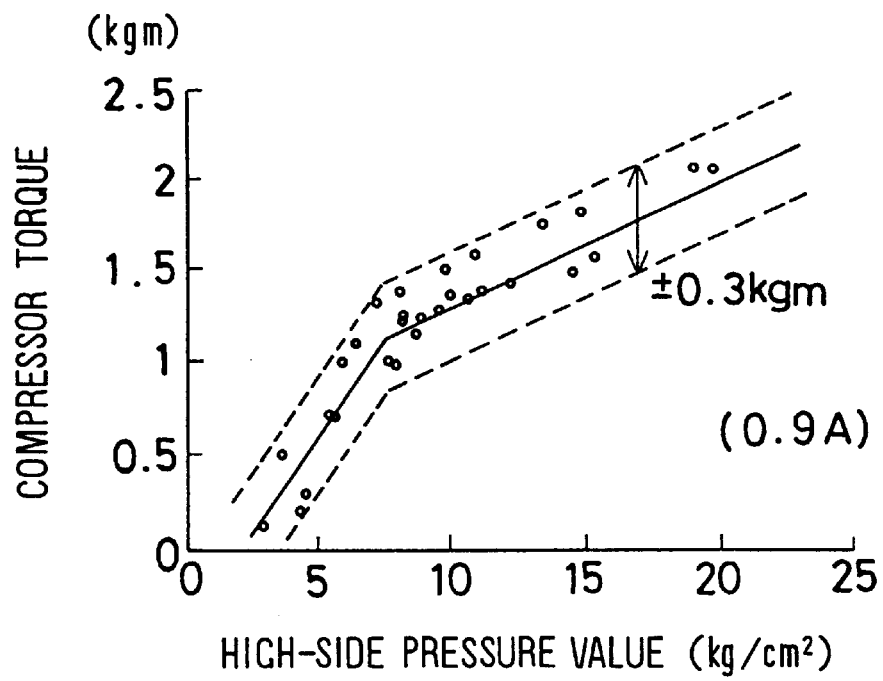
FIG. 9 is a characteristic diagram showing the correlation between high-side pressure value and compressor torque when the control current value is 0.9A.
Figure 10:
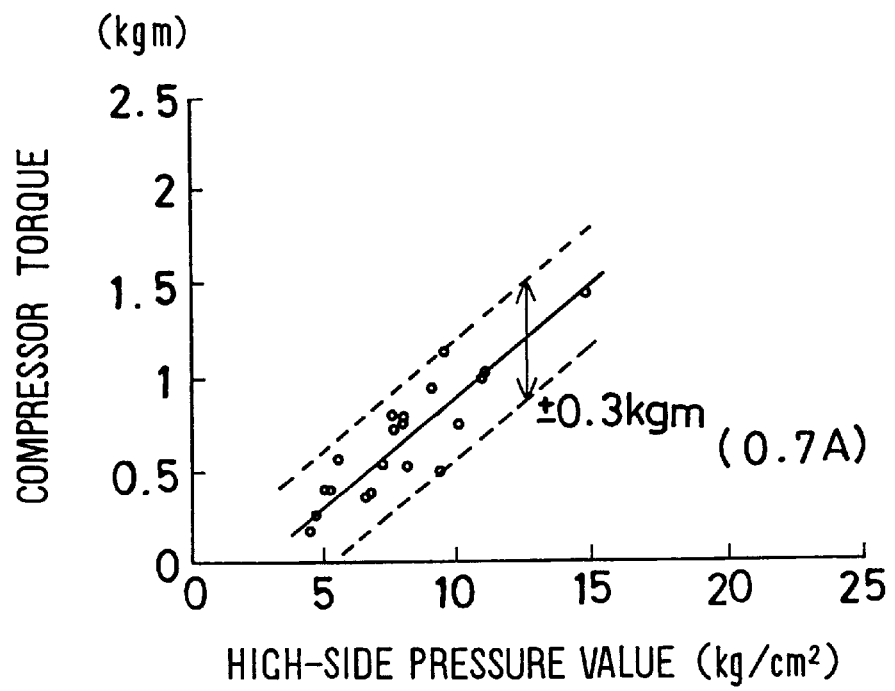
FIG. 10 is a characteristic diagram showing the correlation between high-side pressure value and compressor torque when the control current value is 0.7A.
Figure 11:
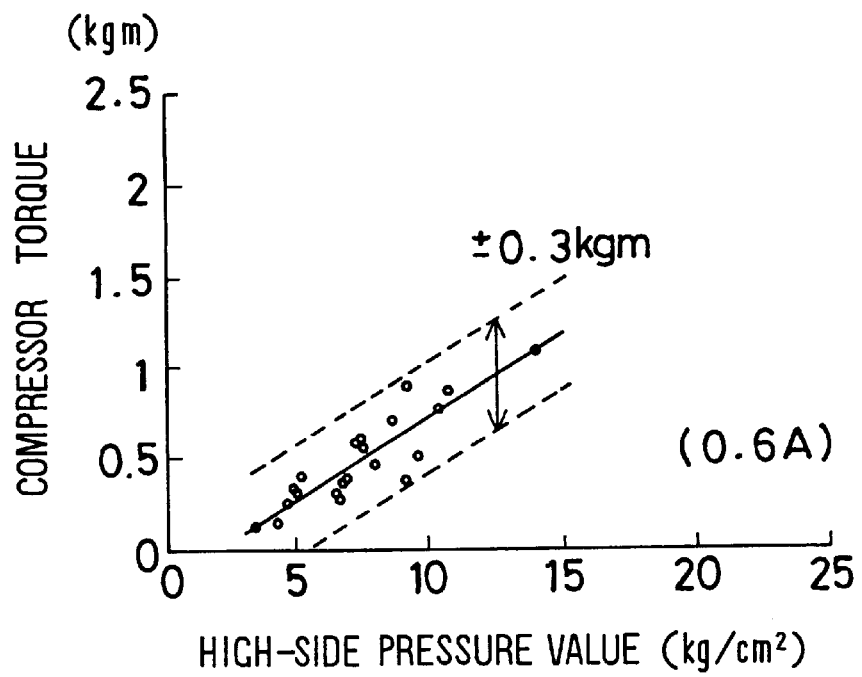
FIG. 11 is a characteristic diagram showing the correlation between high-side pressure value and compressor torque when the control current value is 0.6 A.
Figure 12:
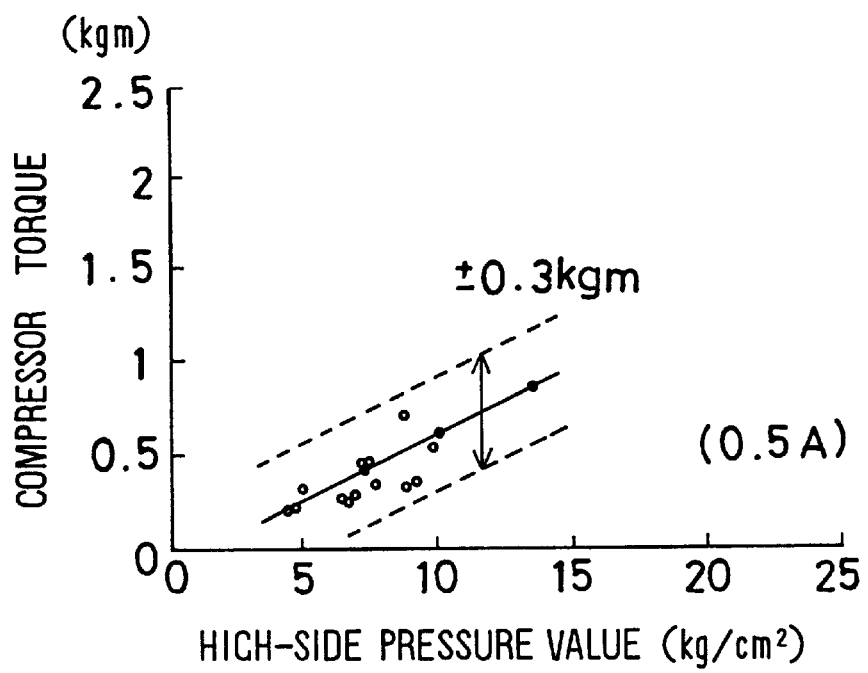
FIG. 12 is a characteristic diagram showing the correlation between high-side pressure value and compressor torque when the control current value is 0.5A.

Next, on the basis of a pattern (characteristic chart, or map) stored in ROM, shown in FIG. 8, a second target post-evaporator cooling air temperature (TEO2) is calculated from the target cooling air temperature (TAO) determined in step S4 (step S5). Specifically, from the pattern shown in FIG. 8, the second target post-evaporator cooling air temperature (TEO2) is so calculated that it becomes higher the higher the target cooling air temperature (TAO) becomes.

Next, it is determined whether or not the first target post-evaporator cooling air temperature (TEO1) determined in step S3 is a lower value than the second post-evaporator cooling air temperature (TEO2) determined in step S6. When the result of this determination is YES, i.e. when it is determined that the first target post-evaporator cooling air temperature (TEO1) is a value lower than the second target post-evaporator cooling air temperature (TEO2), the first target post-evaporator cooling air temperature (TEO1) is read in as the target post-evaporator cooling air temperature (TEO) (step S7).

When on the other hand the determination result of step S6 is NO, that is, it is determined that the second target post-evaporator cooling air temperature (TEO2) is a value equal to or lower than the first target post-evaporator cooling air temperature (TEO1), the second target post-evaporator cooling air temperature (TEO2) is read in as the target post-evaporator cooling air temperature (TEO) (step S8).

After the target post-evaporator cooling air temperature (TEO) is thus determined, for example by feedback control (PI control), a control current value (I) of the compressor 7 constituting a target value of the control current supplied to the electromagnetic coil 63 of the delivery control valve 9 is calculated (step S9). Specifically, the control current value (I) is calculated on the basis of the following equations Equations 3 and 4.

$$En = TE - TEO \qquad \text{Equation 3}$$

$$In = In-1 - Kp\{(En - En-1) + (q/Ti) \cdot En\} \qquad \text{Equation 4}$$

Here, TEO is the target post-evaporator cooling air temperature read in in step S8, Kp is a constant of proportionality, q is a sampling time (for example one second), TE is the actual post-evaporator cooling air temperature, Ti is an integrating time, En is the temperature deviation this time, En−1 is the temperature deviation of the previous time, In is the control current value (I) this time and In−1 is the control current value the previous time.

Next, capacity control of the compressor 7 is carried out so that the actual post-evaporator cooling air temperature (TE) detected by the post-evaporator cooling air temperature sensor 25 and the target post-evaporator cooling air temperature (TEO) become substantially equal. Specifically, the control current value (I) obtained in step S9 is supplied to the electromagnetic coil 63 of the delivery control valve 9 (step S10).

Next, on the basis of the control current value (I) obtained in step S10 and the high-side pressure (Ph) of the refrigerating circuit 5 detected by the high pressure sensor 26, an estimated compressor torque is calculated. Specifically, the estimated compressor torque is calculated on the basis of patterns (characteristic charts, or maps) stored in ROM, shown in FIG. 9 through FIG. 12 (step S11).

The estimated compressor torque obtained in step S11 is then transmitted to the engine ECU 4 (step S12). After that, processing returns to the start.

Figure 13:
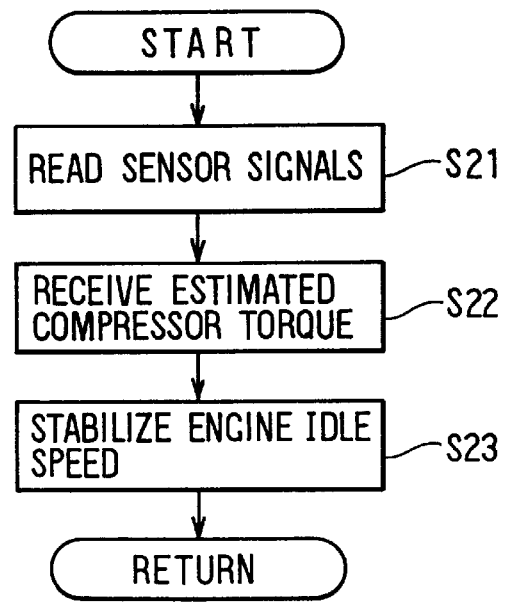
FIG. 13 is a flow diagram showing idling speed stabilizing control executed by an engine ECU.

Next, the operation of the engine ECU 4 of this preferred embodiment will be described briefly on the basis of FIG. 1, FIG. 6 and FIG. 13. FIG. 13 is a flow diagram showing idling speed stabilizing control for the engine ECU 4.

First, when the routine of FIG. 13 starts, sensor signals are read in from sensors (step S21). Specifically, the speed of the vehicle (V) detected by the vehicle speed sensor 27 and the speed (NE) of the engine E detected by the speed sensor 28 are read in.

Then, the estimated compressor torque obtained by the air-conditioning ECU 2 is received (step S22).

Then, on the basis of the received estimated compressor torque, the ISC valve 3, which serves as an idling speed stabilizer, is operated to stabilize the idling speed of the engine E (step S23). After that, processing returns to the start.

Figure 14:
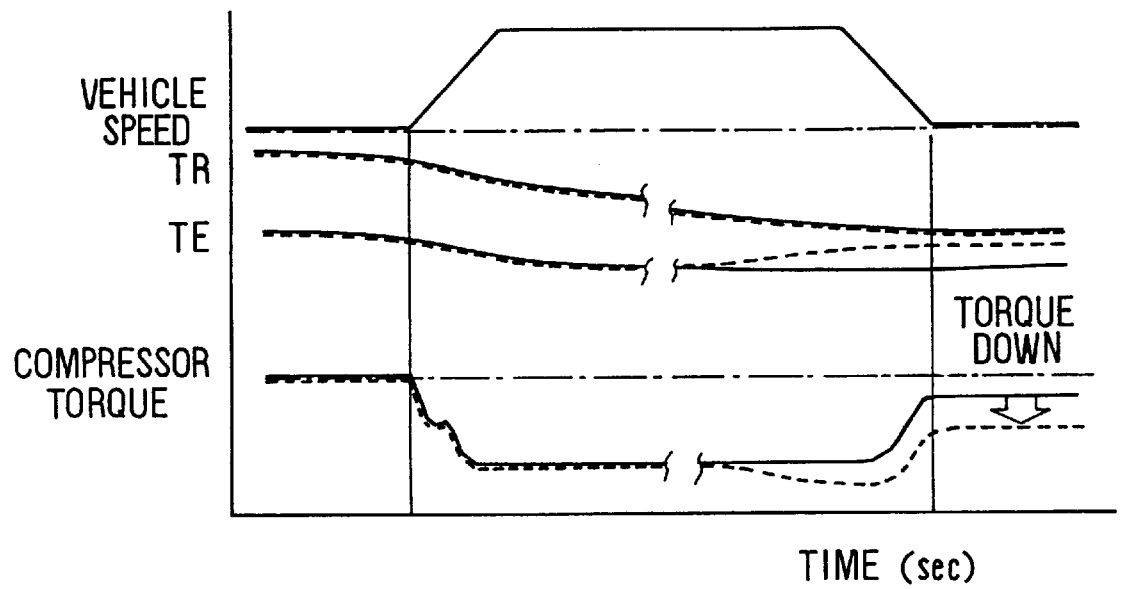
FIG. 14 is a timing diagram showing changes in vehicle speed, inside temperature, post-evaporator cooling air temperature and compressor torque.

The object of the compressor torque calculation will now be described on the basis of FIG. 14. In a refrigerating circuit 5 using an externally variable capacity compressor 7 as in this preferred embodiment, the compressor torque changes greatly in accordance with the cooling heat load. Consequently, for example when the vehicle is driven immediately after the engine E is started and then after a while is stopped, initially the inside temperature (TR: the intake temperature of the air taken in to the evaporator) is high and the cooling heat load is high, but the inside of the passenger compartment gradually cools and the cooling heat load decreases.

Consequently, the compressor torque becomes smaller than the compressor torque of before the vehicle was driven, resulting in a rise in the speed of the engine E. To avoid this, while the vehicle is travelling, the compressor torque that would arise if the engine E were to be brought to idling speed immediately is calculated, the engine ECU 4 is made to perform anticipatory control, and the idling speed of the engine E is thereby stabilized.

Figure 15:
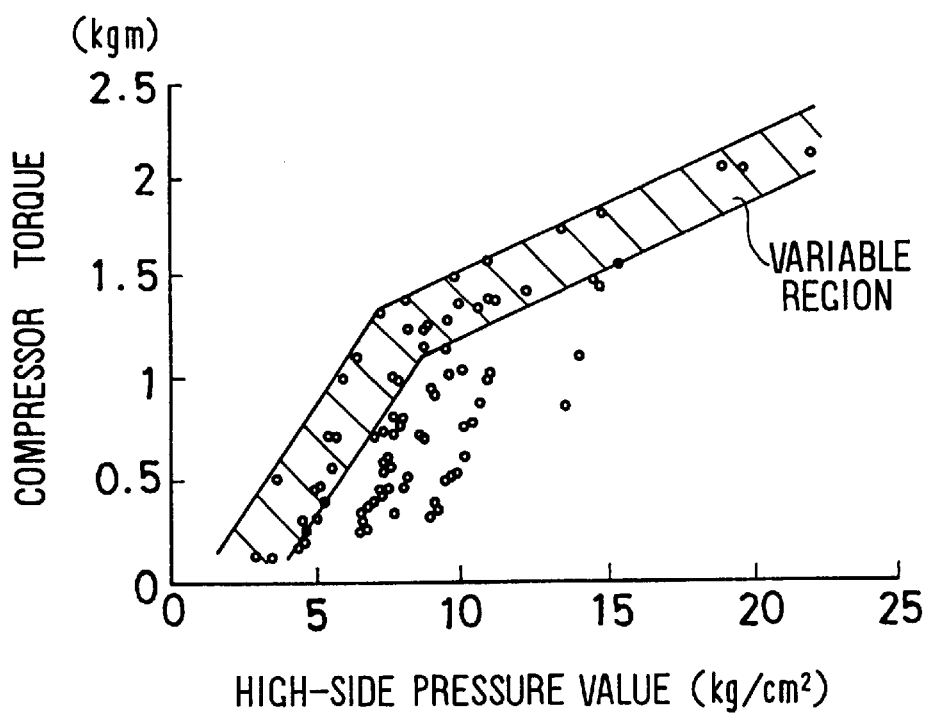
FIG. 15 is a characteristic diagram showing a correlation between high-side pressure value and compressor torque.
Figure 17:
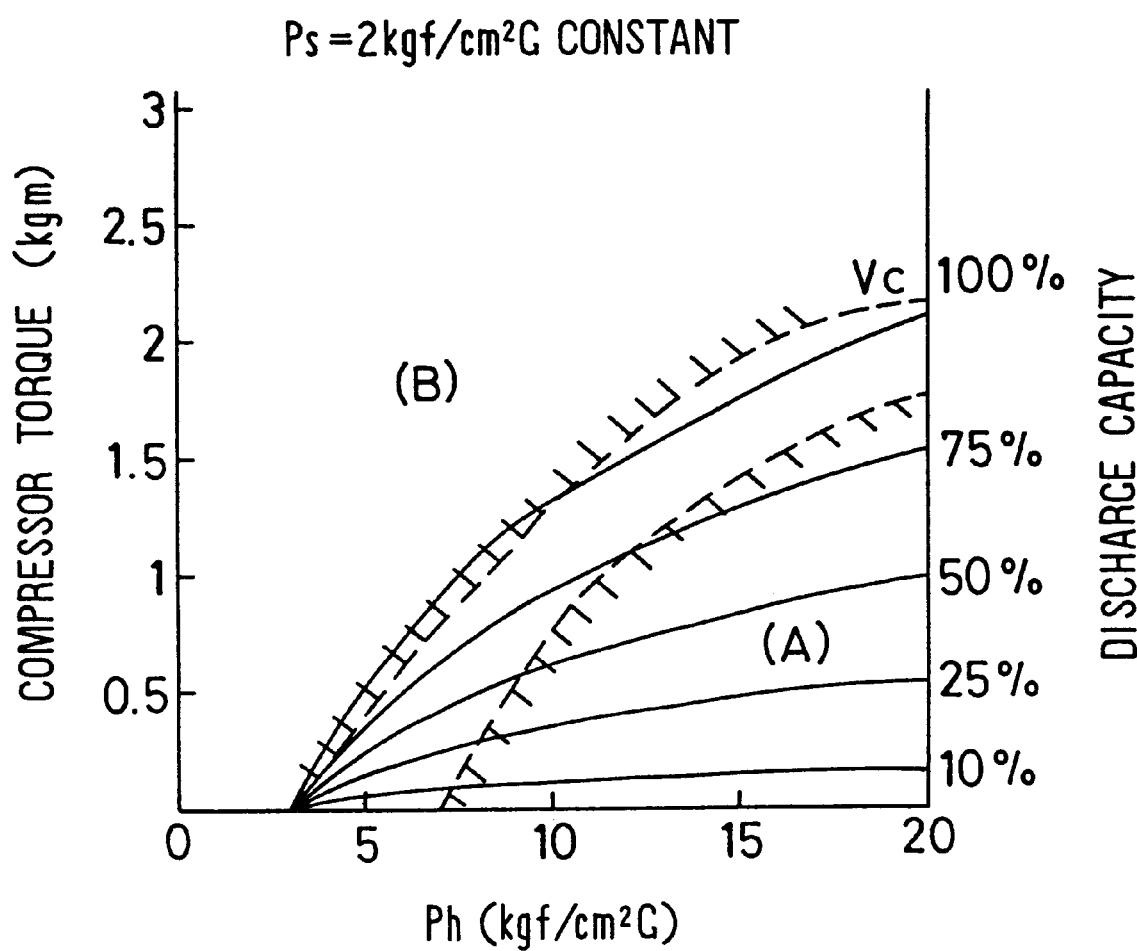
FIG. 17 is a diagram showing relationships between high-side pressure, compressor torque and delivery pressure in a variable capacity refrigerant compressor.

FIG. 15 shows a distribution of compressor torque under all heat load conditions for the externally variable capacity compressor 7. The hatched area in FIG. 15 shows the distribution of compressor torque under all heat load conditions for an internally variable capacity compressor. In the case of a refrigerating circuit having an internally variable capacity compressor, because the width of the distribution of the compressor torque is narrow (±0.3 kgm), the compressor torque can be estimated with the high-side pressure value of the refrigerating cycle alone. Here, an internally variable capacity compressor is a variable capacity compressor for which the set value of the intake pressure cannot be changed.

In the case of a refrigerating circuit 5 having an externally variable capacity compressor 7 as in the present preferred embodiment, on the other hand, because the width of the distribution of the compressor torque is wide, it is impossible to estimate the compressor torque with only the high-side pressure (Ph) of the refrigerating circuit 5. For this reason, in this preferred embodiment, the control current value for directly controlling the compressor 7, i.e. the control current value (I) supplied to the electromagnetic coil 63 of the delivery control valve 9, is added. It is the result of this that is shown in the characteristic diagrams of FIG. 9 through FIG. 12. From these characteristic diagrams, the distribution width of the compressor torque can be estimated to within ±0.3 kgm.

As described above, in this preferred embodiment, in a refrigerating circuit 5 having an externally variable capacity compressor 7, an estimated compressor torque is calculated from the control current value for directly controlling the compressor 7, that is, the control current value (I) supplied to the electromagnetic coil 63 of the delivery control valve 9, and the high-side pressure (Ph) of the refrigerating circuit 5, and stabilizing control of the idling speed of the engine E is carried out on the basis of this estimated compressor torque.

As a result, even if the cooling heat load is an intermediate heat load, the estimated compressor torque calculated and the actual compressor torque are approximately the same. That is, because it is possible to estimate the compressor torque accurately, surging of the engine idling speed can be suppressed, and the occurrence of engine stalling can be suppressed.

Figure 16A:
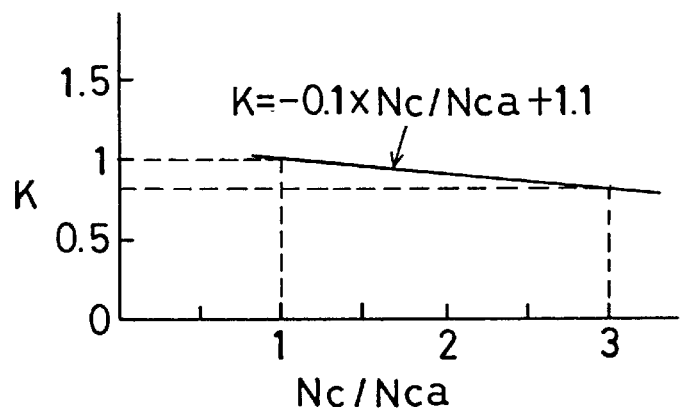
FIG. 16A is a characteristic diagram showing the relationship between (Nc/Nca) and K at capacity 100%.
Figure 16B:
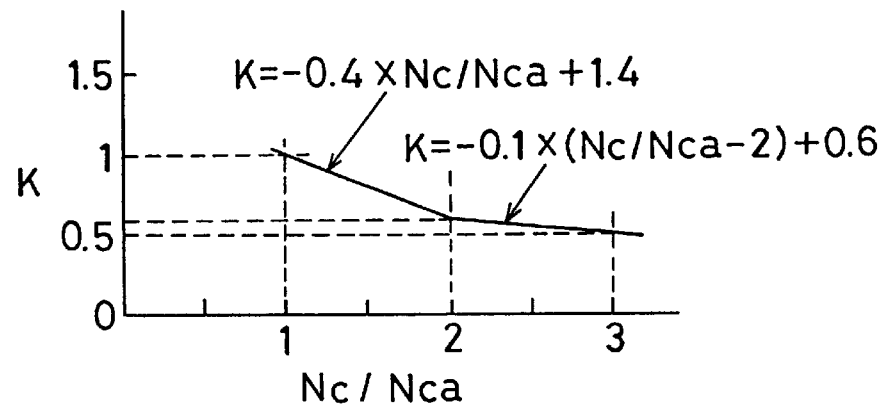
FIG. 16B is a characteristic diagram showing the relationship between (Nc/Nca) and K when the capacity is varied according to a second preferred embodiment of the present invention.

FIGS. 16A and 16B illustrate a second preferred embodiment of the invention: FIG. 16A is a graph showing the relationship between (Nc/Nca) and K when the compressor capacity is 100%, and FIG. 16B is a graph showing the relationship between (Nc/Nca) and K when the compressor capacity is varied.

In this preferred embodiment a speed sensor (not shown) for detecting the compressor speed (Nc) is provided, the compressor speed (Nc) or the engine speed (Ne) is detected, and the compressor torque (T) during constant speed travel is estimated. The reason why this estimation method can be implemented is that the compressor torque (T) during constant speed travel can be calculated on the basis of the following Equation 5.

$$T = \text{compressor torque during idling} \cdot K \qquad \text{Equation 5}$$

Here, $0 < K < 1$. The K in Equation 5 is a function of the compressor speed, and may be directly obtained from the compressor speed (Nc), or may be estimated from the engine speed (Ne) detected by the speed sensor 28. Also, K changes with the state of variation of the externally variable capacity compressor 7, as shown by the correction formulas shown on the characteristic charts of FIGS. 16A and 16B. In FIGS. 16A and 16B, Nc is the compressor speed and Nca is the compressor speed during idling.

By means of the detection of the compressor torque (T) during constant speed travel described above, it is possible also during constant travel to more accurately carry out various elements of engine control such as control of a fuel injection apparatus or a vehicle carburetor, ignition timing control, idling speed control and knock control, and power train control including control of a transmission or the like. Also, when shifting from constant speed travel or idling to accelerating travel, it is possible to prevent a lessening of acceleration due to operation of the air-conditioning unit.

In the preferred embodiments described above, the control current calculator 102 for calculating the control current value for directly controlling the compressor 7 was used as the low pressure detector, but a refrigerant pressure sensor detecting the low-side pressure or the evaporation pressure of the refrigerating circuit 5 or the intake pressure of the compressor 7 may alternatively be used as the low pressure detector.

In the preferred embodiments described above, the outside air temperature (TAM) detected by the outside air temperature sensor 22 used a parameter for calculating the first target post-evaporator cooling air temperature (TEO1), but alternatively the outside air temperature (TAM) detected by the outside air temperature sensor 22 may be used as the parameter for calculating the first target post-evaporator cooling air temperature (TEO1) when an intake mode is an outside air introducing mode. Further, the inside temperature (TR) detected by the inside air temperature 23 may be used when the intake mode is an inside air circulating mode.

Also, an intake temperature sensor for detecting the intake temperature of air taken in to the evaporator 6 may be provided inside the air-conditioning duct 10 on the upstream side of the evaporator 6. Further, instead of the outside air temperature, the intake temperature detected by the intake temperature sensor may be used as the parameter for calculating the first target post-evaporator cooling air temperature (TEO1).

Although in the preferred embodiments described above rotational power of the engine E was transmitted to the compressor 7 by a belt transmission mechanism and an electromagnetic clutch 8 interposed between the compressor 7 and the engine E, alternatively the compressor 7 and the engine E may be directly connected.

The preferred embodiments described above are so constructed that the set value of the intake pressure of the compressor 7 becomes lower as the control current value (I) supplied to the electromagnetic coil 63 of the delivery control valve 9, i.e. the control current value (I) for directly controlling the compressor 7, increases. However, alternatively, the set value of the intake pressure of the compressor 7 may become lower as the control current value (I) decreases.

In the preferred embodiments described above, the ISC valve 3 was operated, and stabilizing control of the idling speed of the engine carried out on the basis of an estimated compressor torque. Alternatively, for example, the speed-changing pattern of an automatic transmission of the vehicle may be changed on the basis of the estimated compressor torque.

Specifically, when the estimated compressor torque is large, for example, the speed increase from first gear to second gear or from second gear to third gear may be made to occur less readily. Alternatively, the transmission may be prohibited from going into overdrive. And when the estimated compressor torque is small, the speed increase from first gear to second gear or from second gear to third gear may be made to occur more readily. Or the transmission may be made to go into overdrive more readily.

By finely controlling changes of the pattern of automatic speed-changing on the basis of an estimated compressor torque, because the speed of the engine E can be kept lower, the rate of fuel consumption of the engine E is lower, and it is possible to prevent degradation of fuel economy.

In a direct fuel injection type engine, when the engine load is small the engine is run with a lean burn and when the engine load is large due, for example, to a compressor having been turned on, the amount of fuel injected into the engine is increased, the air-fuel ratio is lowered, and the engine is run with an ordinary air-fuel ratio.

In this connection, in this kind of direct injection type engine, by finely controlling changes of the amount of fuel injected into the engine, according to the value of an estimated compressor torque approximating to the actual compressor torque, because it is possible to reduce the amount of fuel injected into the engine, the rate of fuel consumption of the engine E is lower and it is possible to prevent degradation of fuel economy.

While the above description is of the preferred embodiments of the present invention, the present invention may be modified, varied and altered without deviating from the scope and meaning of the following claims.

What is claimed is:

1. An air-conditioning apparatus for a vehicle, comprising:
   (a) a refrigerating circuit, comprising:
      an evaporator for evaporating refrigerant flowing in thereto from pressure-reducing means;
      a refrigerant compressor for compressing refrigerant flowing in thereto from the refrigerant evaporator; and
      delivery capacity varying means for varying the delivery capacity of the refrigerant compressor by changing a set value of intake pressure of the refrigerant compressor in correspondence with a control current value supplied thereto;
   (b) high pressure detecting means for detecting a high-side pressure of the refrigerating circuit;
   (c) low pressure detecting means for detecting a low-side pressure of the refrigerating circuit; and
   (d) torque calculating means for calculating a compressor torque needed to drive the refrigerant compressor on the basis of the detected high-side and low-side pressures.

2. The air-conditioning apparatus of claim 1, wherein the high pressure detecting means is a high pressure sensor for detecting the pressure of refrigerant in the refrigerating circuit between the refrigerant compressor and the pressure-reducing means.

3. The air-conditioning apparatus of claim 1, wherein the low pressure detecting means comprises a control current detector for detecting the control current value supplied to the delivery capacity varying means.

4. The air-conditioning apparatus of claim 1, further comprising:
   cooling degree detecting means for detecting a degree of cooling effected by the refrigerant evaporator;
   target cooling degree determining means for determining a target degree of cooling in correspondence with at least an outside air temperature; and
   compressor controlling means for varying the delivery capacity of the refrigerant compressor by changing the control current value supplied to the delivery capacity varying means such that the degree of cooling effected by the refrigerant evaporator and detected by the cooling degree detecting means approaches the target degree of cooling determined by the target cooling degree determining means.

5. The air conditioning apparatus of claim 1, wherein the compressor is driven by a vehicle engine, and further comprising an engine controller for controlling the speed of the engine driving the refrigerant compressor, the engine controller including speed stabilizing control means for stabilizing the idling speed of the engine based on the compressor torque calculated by the torque calculating means.

6. The air conditioning apparatus of claim 5, wherein control of the engine or control of a power transmission is carried out on the basis of the compressor torque calculated by the torque calculating means.

7. The air-conditioning apparatus of claim 1, further comprising compressor speed detecting means for detecting the speed of the refrigerant compressor, wherein the torque calculating means calculates the compressor torque needed to drive the refrigerant compressor on the basis of the refrigerant compressor speed detected by the compressor speed detecting means, the high-side pressure detected by the high pressure detecting means and the low-side pressure detected by the low pressure detecting means.

8. A motor vehicle air-conditioning apparatus, comprising:

a refrigerating circuit including an evaporator for evaporating low pressure refrigerant, and a compressor for compressing refrigerant input from the evaporator, the compressor including a capacity control mechanism that varies a set intake pressure of the compressor based on a control signal supplied thereto;

a detector that detects a high-side pressure of the refrigerating circuit; and a controller that is operative to control an operating torque of the compressor based on the high-side pressure and the control signal.

9. The air conditioning apparatus of claim 8, wherein the control signal represents a low-side pressure of the compressor.

10. The air conditioning apparatus of claim 9, wherein the capacity control mechanism is an electromagnetic control valve operative to vary the refrigerant delivery capacity of the compressor based on the control signal generated by the controller.

11. The air conditioning apparatus of claim 10, further comprising a temperature detector in communication with the controller for detecting a temperature of a passenger compartment, the controller outputting the control signal to vary the refrigerant delivery capacity of the compressor to thereby cause the detected temperature to approach a target temperature.

12. The air conditioning apparatus of claim 8, wherein the controller is further operative to stabilize speed of a vehicle engine based on the estimated torque of the compressor and on vehicle operating parameters.

13. The air conditioning apparatus of claim 8, further comprising a compressor speed sensor for sensing the compressor speed, wherein the controller is further operative to estimate compressor torque during constant speed travel as a function of compressor speed.

14. A method for controlling an externally variable compressor in a motor vehicle air conditioner, comprising:

sensing air conditioner operating parameters, including an outside air temperature of air outside the passenger compartment and an inside air temperature for air inside the passenger compartment;

determining a target cooling air temperature based on the step of sensing;

supplying a compressor control current to the compressor, the compressor control current having a value based on the step of determining a target cooling temperature and representative of a refrigerating circuit low-side pressure;

detecting a refrigerating circuit high-side pressure; and estimating a compressor torque required to drive the compressor based on the compressor control current and the refrigerating circuit high-side pressure.

15. The method of claim 14, wherein sensing air conditioning operating parameters further comprises determining a set temperature for a passenger compartment.

16. The method of claim 14, wherein determining a target cooling air temperature comprises:

calculating a first target cooling air temperature based on the sensed outside air temperature;

calculating a target air temperature for conditioned air blown into the passenger compartment from the sensed air conditioner operating parameters including both the outside and the inside air temperatures;

calculating a second target cooling air temperature based on the target air temperature;

determining if the first target cooling air temperature is lower than the second target cooling temperature; and reading the lower of the first and second target cooling air temperatures as the determined target cooling air temperature.

17. The method of claim 14, further comprising the step of stabilizing engine speed based on the estimated compressor torque value obtained from the step of estimating.

* * * * *